US006437889B2

United States Patent
Davidson

(10) Patent No.: US 6,437,889 B2
(45) Date of Patent: Aug. 20, 2002

(54) METHOD AND APPARATUS FOR BIT SYNCHRONIZATION IN OPTICAL COMMUNICATION AND NETWORKING SYSTEMS

(75) Inventor: Howard L. Davidson, San Carlos, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 0 days.

(21) Appl. No.: 09/827,836

(22) Filed: Apr. 5, 2001

Related U.S. Application Data

(63) Continuation of application No. 09/082,885, filed on May 31, 1998, now Pat. No. 6,239,892.

(51) Int. Cl.$^7$ ................................................ H04J 14/08
(52) U.S. Cl. ...................... 359/135; 359/140; 359/158; 375/355; 370/503
(58) Field of Search ................................ 359/135, 140, 359/158; 375/354, 355; 370/503, 506, 509–510, 518, 520

(56) References Cited

U.S. PATENT DOCUMENTS

| | | | |
|---|---|---|---|
| 4,427,895 A | 1/1984 | Eng | 250/551 |
| 5,493,433 A | 2/1996 | Prucnal et al. | 359/123 |
| 6,239,892 B1 * | 5/2001 | Davidson | 359/135 |

FOREIGN PATENT DOCUMENTS

| | | |
|---|---|---|
| WO | 97/31436 | 8/1997 |

OTHER PUBLICATIONS

Blixt et al., "An Optical Technique for Bit and Packet Synchronization", LEOS '94 Conference Proceedings, IEEE, 1994, pp. 103–104.*

Zhang, "Novel all–optical time–division multiple–access technique for multirate data communications," ©1996 Society of Photo–Optical Instrumentation Engineers, pp. 722–725.

International Search Report, application no. PCT/US 99/11894, mailed Mar. 13, 2000.

* cited by examiner

*Primary Examiner*—Kinfe-Michael Negash
(74) *Attorney, Agent, or Firm*—Conley, Rose & Tayon, PC; B. Noël Kivlin

(57) ABSTRACT

An apparatus and method are provided for bit synchronization in an optical time division multiplexed communication system. The apparatus is couplable to an optical gate, such as an optical demultiplexer. The apparatus includes a programmable optical delay line couplable to an input clock; an optical synchronizer coupled to the programmable optical delay line and couplable to the optical gate; and a processor coupled to the programmable optical delay line and to the optical synchronizer. The processor includes program instructions to track bit synchronization between a clock pulse and a selected data bit during a communication session; and when a bit tracking range is approaching a predetermined limit, the processor having further instructions to interrupt the communication session, return the bit tracking range to a zero offset and correspondingly adjust a programmable delay, and resume the communication session.

28 Claims, 9 Drawing Sheets

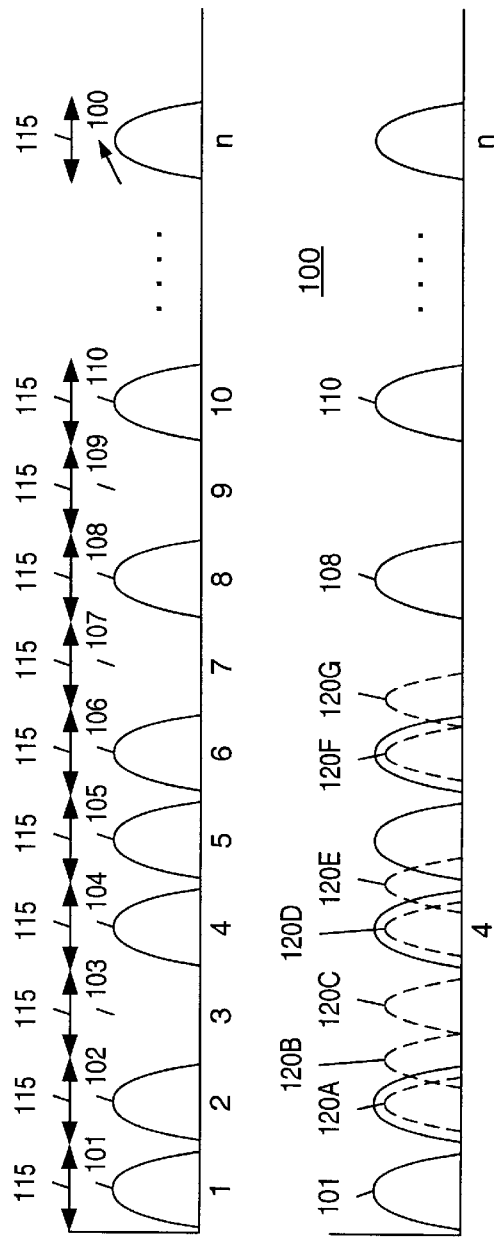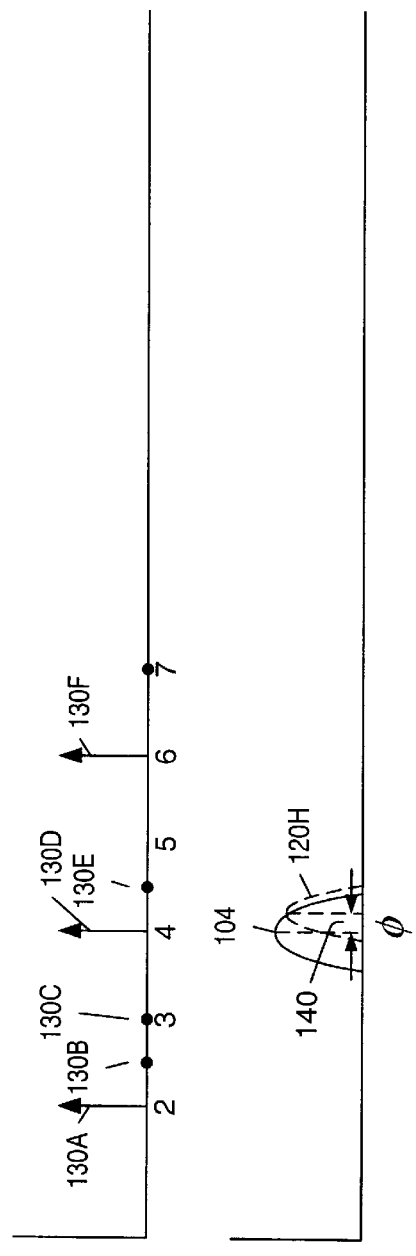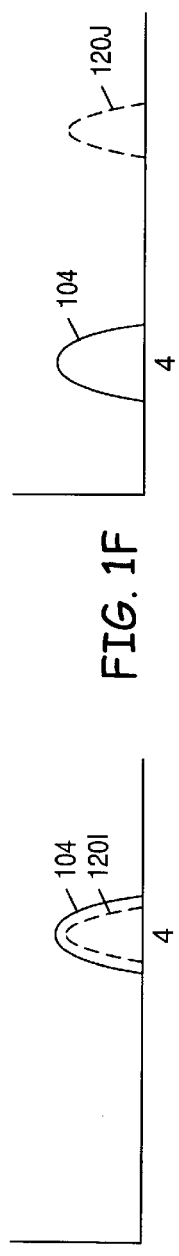
FIG. 1A  FIG. 1B  FIG. 1C  FIG. 1D  FIG. 1E  FIG. 1F

METHOD AND APPARATUS FOR BIT SYNCHRONIZATION IN OPTICAL COMMUNICATION AND NETWORKING SYSTEMS This application is a continuation of U.S. application Ser. No. 09/082,885, filed May 31, 1998, now U.S. Pat. No. 6,239,892.

FIELD OF THE INVENTION

The present invention relates in general to optical communication and networking systems and, more particularly, to bit synchronization for high speed data transmission in optical communication and networking systems.

BACKGROUND OF THE INVENTION

With the advent of high speed data communications, optical transmission media are becoming increasingly common. For high bandwidth applications, for example, fiber optic cable and hybrid fiber-coaxial cable are often the transmission media of choice. The well-known advantages of such optical transmission systems include high bandwidth, high transmission capacity, and high noise immunity, resulting in very high data transmission speeds and low error rates.

The use of optical transmission media has also engendered a need for optical switching devices, optical routing devices, and optical logic gates. Typically in the prior art, the data or other information for optical transmission has been interconverted between optical and electronic forms. For example, data for transmission is typically generated and packaged electronically, then converted into laser pulses for optical transmission. Again, at the receiving end, the received light pulses are converted into an electronic form for further processing in, for example, a personal computer, a workstation, a server, or a router.

Various optical devices have been developed, however, which diminish the need for such optical-electronic inter-conversions. For example, an optical device referred to as a "TOAD" has been developed which performs the logical AND function. As another example, this can be used to implement an optical demultiplexer, which allows for selection of one or more channels from time division multiplexed channels, with one channel selected per optical AND gate. These optical gates typically utilize a clock pulse periodically ANDed with selected bits of an optical time division multiplexed ("OTDM") channels to produce an output bit stream from the selected channel. See, e.g., Prucnal et al. U.S. Pat. No. 5,493,433, "Terahertz Optical Asymmetric Demultiplexer". For high speed data transmission, for example, an OTDM transmission in the range of terabits per second may include 1000 multiplexed channels, utilizing a transmission frame of 1000 bits with one bit per channel, with each channel operating at a 1 gigabit per second data transmission rate, with a bit period (or bit time) of $10^{-12}$ seconds.

To enable such extremely high data rates in optical communications, however, various difficulties must be overcome which do not arise in lower speed communications. For example, due to external or environmental factors, the physical characteristics of optical fiber may change slightly, such as changes in the index of refraction and the physical length expanding or contracting depending upon environmental temperatures. At lower data rates, such changes may be inconsequential. At these higher terabit per second data rates, however, such physical changes may affect several bit periods, requiring new solutions to these new, heretofore non-existent problems. For example, due to the physical characteristics of optical fibers, thermal fluctuations may cause a relative drift, skew or other mismatch between the clock pulse and the desired OTDM data channel in a demultiplexer. At terabit data rates, such a drift or skew may cause errors in data transmission, such as erroneously interpreting a logical 1 as a logic zero, or may cause the wrong channel to be erroneously decoded, particularly should the drift span several bit periods. In contrast, such skewing in the picosecond range is irrelevant at current lower speed data rates, such as gigabit/second rates.

As a consequence, a need remains for an apparatus and method to maintain bit synchronization in optical transmission media. Such an apparatus and method should be able to track relative bit drifting or skewing, and maintain bit synchronization spanning several bit periods during a single transmission and without interruption of the transmission. In addition, such an apparatus and method should be capable of cost-effective implementation.

SUMMARY OF THE INVENTION

The apparatus and method embodiments of the present invention provide optical bit synchronization for optical communication and networking systems. The invention provides the capability to track relative bit drifting or skewing between clock pulses and selected data channels. The apparatus and method embodiments maintain such bit synchronization spanning several bit periods during a single transmission and without interruption of the transmission. The apparatus and method embodiments overcome a significant problem in optical communications, namely, the lack of available optical memory devices which are capable of data buffering and data storage at terabit per second data rates. In addition, the apparatus and method embodiments may be implemented cost-effectively.

The apparatus embodiment utilizes three main components, a programmable optical delay line, an optical synchronizer, and a processor (such as a microprocessor). The apparatus is preferably attached to an input of an optical gate, such as an optical demultiplexer, and is used to synchronize an input clock signal with an input data signal. Such synchronization is important both to properly select a data channel in an optical time division multiplexed system, and to correctly decode the data bit stream of the selected channel.

This problem of optical bit synchronization addressed by the present invention is new, and arises with previously unavailable and extremely high transmission rates, such as data rates in the terabits per second range. For such data rates, in accordance with the present invention, the synchronization of clock pulses has an extraordinarily small control resolution, such as within 0.5 picoseconds. Two control signals are utilized to accomplish this extreme precision, an offset signal and an interpolation signal. Continuously tracking a developing phase difference between the clock pulse and the selected data bit, the interpolation signal is utilized to delay or accelerate the clock pulse to keep it in synchrony with the data pulse. For example, the interpolation signal is utilized to continuously track comparatively small phase differences between the clock pulse and the data pulse, as these phase differences may develop. An offset signal is utilized to maintain such synchronization within the center of its physical range, particularly as the bit tracking may span one or more bit periods during a single communication session.

An apparatus embodiment of the present invention includes a programmable optical delay line couplable to an input clock; an optical synchronizer coupled to the programmable optical delay line; and a processor coupled to the programmable optical delay line and to the optical synchronizer. The processor includes program instructions to track bit synchronization between a clock pulse and a selected data bit during a communication session, generally utilizing the interpolation signal. When a bit tracking range of the optical synchronizer is approaching a predetermined limit, such that it will begin to exceed its dynamic range, the processor has further instructions to first, interrupt the communication session; second, return the bit tracking range to a zero offset (so that the optical synchronizer is in the center of its dynamic range); third, correspondingly adjust the timing of a programmable delay line; and fourth, resume the communication session.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 1A is a graphical diagram illustrating an optical time division multiplexed frame of N bits.

FIG. 1B is a graphical diagram illustrating an optical time division multiplexed frame of N bits with superimposed clock pulses.

FIG. 1C is a graphical diagram illustrating output bits (or pulses) resulting from logically ANDing clock pulses with the optical time division multiplexed frame of N bits.

FIG. 1D is a graphical diagram illustrating a timing difference between a clock pulse and a data bit from a selected channel of the optical time division multiplexed frame of N bits.

FIG. 1E is a graphical diagram illustrating a clock pulse synchronized with a data bit from a selected channel of the optical time division multiplexed frame of N bits in accordance with the present invention.

FIG. 1F is a graphical diagram illustrating a clock pulse which is not synchronized with a data bit from a selected channel of the optical time division multiplexed frame of N bits.

DETAILED DESCRIPTION OF THE INVENTION

Figure 2:
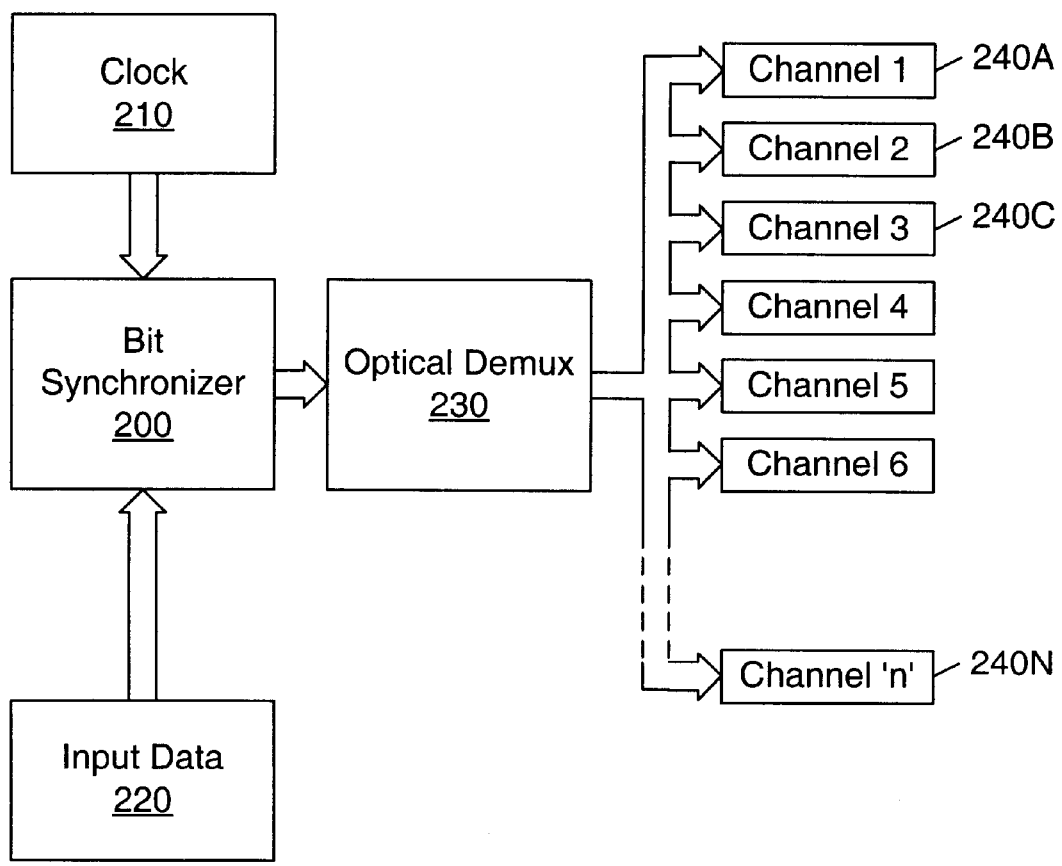
FIG. 2 is a block diagram illustrating bit synchronization for channel selection in accordance with the present invention.

As mentioned above, a need remains for an apparatus and method to maintain bit synchronization in optical transmission media. As explained in greater detail below, the apparatus and method embodiments of the present invention provide such optical bit synchronization, providing capability to track relative bit drifting or skewing between clock pulses and selected data channels. The apparatus and method embodiments maintain such bit synchronization spanning several bit periods during a single transmission and without interruption of the transmission. The apparatus and method embodiments overcome a significant problem in optical communications, namely, the lack of available optical memory devices which are capable of data buffering and storage at terabit data rates. In addition, the apparatus and method embodiments may be implemented cost-effectively.

The apparatus and method embodiments are preferably utilized for high bandwidth or high capacity situations, such as in network or server switches, local or wide area networks, internet switches, and telephone exchanges, which may require a significant number of channels, with each channel having significant transmission capacity.

Also as mentioned above, this problem of optical bit synchronization addressed by the present invention is new, and arises with previously unavailable and extremely high transmission rates, such as data rates in the terabits per second range. For such data rates, in accordance with the present invention, the synchronization of clock pulses has an extraordinarily small control resolution, such as within 0.5 picoseconds. With developments in laser technology, moreover, it is anticipated that a control resolution in the femtosecond range may also become desirable. As discussed in greater detail below, two control signals are utilized to accomplish this extreme precision, an offset signal and an interpolation signal. Continuously tracking a developing phase difference between the clock pulse and the selected data bit, the interpolation signal is utilized to delay or accelerate the clock pulse to keep it in synchrony with the data pulse. For example, the interpolation signal is utilized to continuously track comparatively small phase differences between the clock pulse and the data pulse, as these phase differences may develop. An offset signal is utilized to maintain such synchronization within the center of its physical range, particularly as the bit tracking may span one or more bit periods during a single communication session. In addition, in the preferred embodiment, a dither signal is utilized to introduce a small, periodic time difference having a known phase, to provide a known signal for tracking purposes.

The various subparts of FIG. 1 graphically illustrate the optical bit synchronization of the present invention. FIG. 1A is a graphical diagram illustrating an optical time division multiplexed frame 100 of N data bits, in which each data bit represents a channel. As illustrated in FIG. 1A, channel 1 has a binary logic 1 pulse (or bit) 101, channel 2 has a binary logic 1 pulse (or bit) 102, channel 3 has a binary logic zero pulse (or bit) 103, and so on. Each such pulse or data bit is allocated a predetermined amount of time in which to occur, referred to as a bit period and illustrated as bit periods 115. Successive OTDM frames 100, when demultiplexed, generate various bit streams corresponding to a selected channel. For example, selecting the sixth bit 106 of frame 100, followed by selecting the sixth bit of the next frame, and so on ,will generate a data bit stream which comprises the sixth channel of the N multiplexed channels. Such a frame 100 may be utilized for communication, networking, and other information transmission (individually and collectively referred to herein as "communication" or "communications").

FIG. 1B is a graphical diagram illustrating an optical time division multiplexed frame 100, again having N bits, with various superimposed clock pulses 120A through 120G. FIG. 1C iS a graphical diagram illustrating output bits (or pulses) resulting from logically ANDing the clock pulses 120A through 120G with the OTDM frame 100. Referring to FIG. 1B, depending upon the location in the bit stream of a clock pulse, different channels may be selected. For the selection of channel 4, for example, clock pulse 120D should be utilized, such that when ANDed with frame 100, both channel 4 (represented by bit 104) is selected and an accurate output is provided. This correct output bit is illustrated as pulse 130D in FIG. 1C, correctly representing the binary one of channel 4, rather than an erroneous binary zero.

Continuing to refer to FIG. 1B, supposing that the clock pulse has drifted relative to the selected channel, the clock pulse may now be appearing as pulse 120E. If clock pulse 120E is then ANDed with the frame 100, an erroneous output of a binary logic zero would be generated, illustrated as bit 130E in FIG. 1C. If the clock pulse were to drift further in the same direction, illustrated as clock pulse 120F, when ANDed with frame 100, there will be a resulting binary logic 1 pulse (illustrated as bit 130F in FIG. 1C), but erroneously representative of channel 6 (bit 106), not channel 4.

Similarly, supposing a clock drift in the other direction, such as clock pulses 120A, 120B and 120C, when ANDed with frame 100, will also produce erroneous results, such as the binary logic zeros of bits 130D and 130D, or erroneous channel selection, such as selection of channel 2 (bit 130A).

FIG. 1D is a graphical diagram illustrating a timing difference 140 between a clock pulse 120H and a data bit 104 (from a selected channel 4 of the optical time division multiplexed frame 100). FIG. 1E is a graphical diagram illustrating a clock pulse 120I synchronized, in accordance with the present invention, with data bit 104 from the OTDM frame 100. Referring to FIG. 1D, and again selecting channel 4, data pulse 104 is to be ANDed with clock pulse 120H which is slightly out of timing synchrony with data pulse 104, illustrated as timing difference 140. In accordance with the present invention, the timing of successive clock pulses will be accelerated or delayed to be properly synchronous (in-phase) and coincident with the data pulse 104, illustrated as synchronous (in-phase) clock pulse 120I in FIG. 1E. The control signal referred to as an interpolation signal is utilized for such continuous, small incremental changes to correct such timing differences and maintain synchrony, as such incremental changes are typically considerably smaller than a bit period and, therefore, are interpolations of the bit period. (In contrast, the offset signal will typically provide a larger change, in the range of one or more bit periods). Such a clock pulse 120I, when ANDed with data pulse 104, will yield a correct result, namely properly selecting channel 4 with correct data interpretation, here, binary logic one.

FIG. 1F is a graphical diagram illustrating a clock pulse 120J which is not synchronized with a data bit 104 from a selected channel 4 of the optical time division multiplexed frame 100. In contrast with the present invention, FIG. 1F illustrates continued drift of a clock pulse 120J, relative to data pulse 104. In these circumstances, when clock pulse 120J is ANDed with frame 100, channel 4 will not be selected; instead, another channel will be selected erroneously, with whatever data is carried in that channel. Depending upon the degree of relative drift of the clock pulse, another channel may be selected (other than the proper channel), or the properly selected channel may be erroneously interpreted, depending upon the time (or phase) difference. For example, utilizing the synchronized (in-phase) clock pulse 120D, a logic one pulse such as pulse 104 is correctly interpreted as logic one bit 130D (in FIG. 1C); in contrast utilizing clock pulse 120E (which has a timing difference of ½ of abit period) will cause an erroneous interpretation of the channel 4 pulse 104 as, a logic zero bit 130E (in FIG. 1C).

FIG. 2 is a block diagram illustrating bit synchronization as utilized for channel selection in accordance with the present invention. As illustrated in FIG. 2, bit synchronizer 200 receives input from a clock 210 and data 220. In this instance, the bit synchronizer 200 is utilized with or as part of the optical demultiplexer 230. As discussed above, depending upon the bit selected in each frame of input data 220, various channels may be output, such as the first channel 240A, second channel 240B, and so on, through the $n^{th}$ channel 240N. For example, the demultiplexer 230 would have "n" AND gates, with each AND gate providing an output of one selected channel (i.e., one channel per optical AND gate). Not separately illustrated in FIG. 2, the bit synchronizer 200 preferably has two components, first, a programmable optical delay line, and second, a bit tracker.

As discussed in greater detail below, the programmable optical delay line (or other higher order device) is initially utilized to select the appropriate channel for demultiplexing. The bit tracker is then utilized to continuously track the same channel, by correcting for any drift or skew in the clock pulse. In the preferred embodiment, the bit tracker is initially set in the center of its tracking range, i.e., having no (zero) offset in either a plus (accelerated timing) or minus (delayed or decelerated timing) direction. For example, the pulse illustrated as clock pulse 120D in FIG. 1B is initially synchronized with a zero offset, such that the bit tracker may then move in either direction, accelerating the timing of the clock pulse, such as pulse 120C in FIG. 1B, or delaying the timing of the clock pulse, such as pulse 120E in FIG. 1B. Depending upon environmental conditions, as the selected channel is demultiplexed, it is possible that the relative drift between the clock pulse and the selected channel begins to exceed or approaches a limit of the physical capabilities of the bit tracker, such that its positive or negative offset is at the end of its physical range. Also as discussed in greater detail below, in this event, data transmission is interrupted, the programmable delay line is adjusted accordingly, and the offset is returned to zero, as illustrated in greater detail below with regard to FIGS. 3 and 4.

A significant feature of the present invention is the continuous bit tracking over a multiple bit periods without resetting or reprogramming the programmable optical delay line. Such resetting or reprogramming is preferably avoided as inefficient, as it may cause an interruption in transmission or may cause a loss of data bits (requiring retransmission). In contrast, such reprogramming in the prior art, electronic transmission systems is not an issue, as data bits may be buffered and stored during such reprogramming periods. Optical communication systems, however, currently do not have such a buffering and storage option, as there are currently no optical memory devices available which are capable of operating at such high, terabit data rates.

Figures 3, 4:
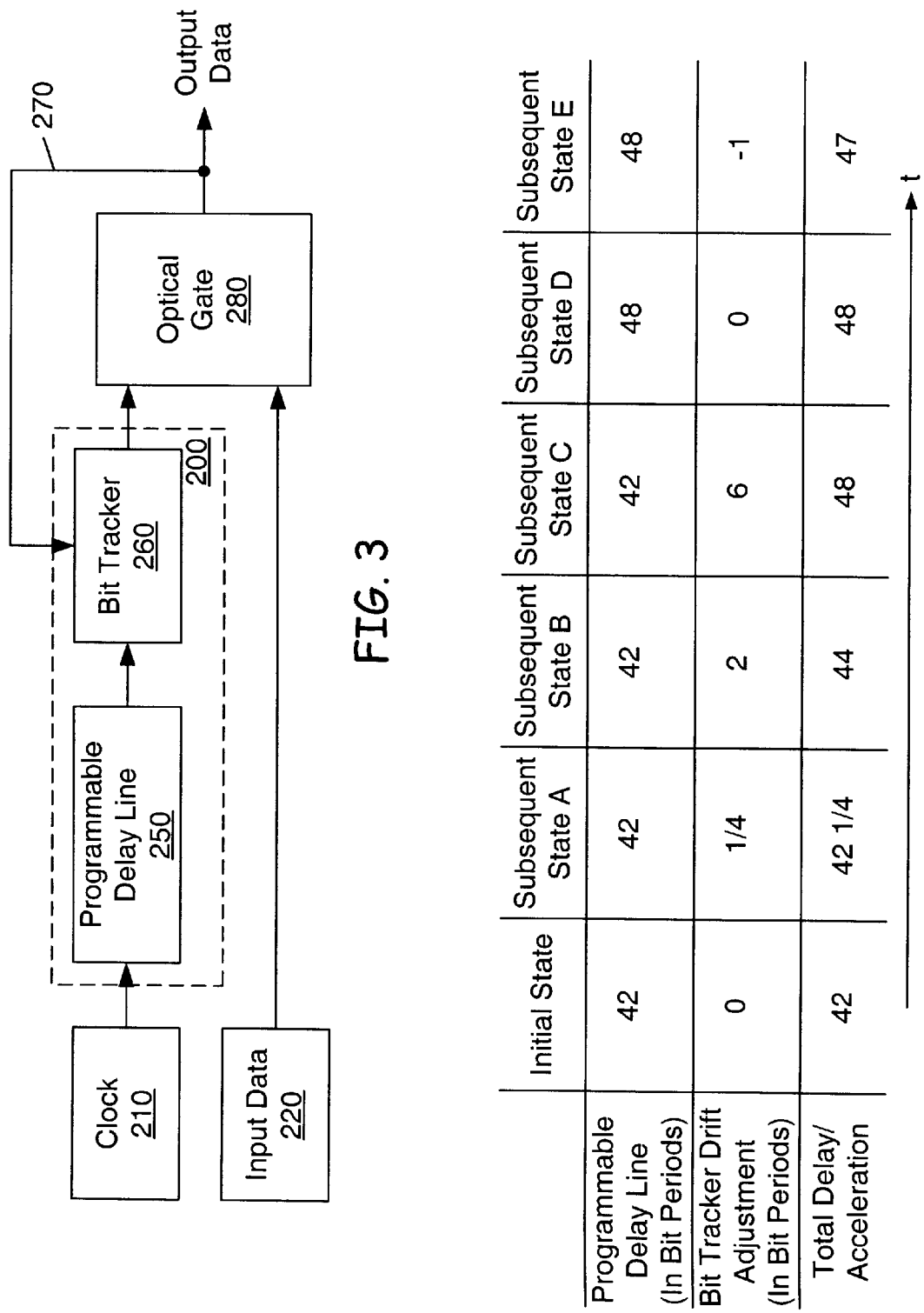
FIG. 3 is a block diagram illustrating a bit synchronization apparatus in accordance with the present invention.
FIG. 4 is a tabular diagram illustrating exemplary states of the bit synchronizer in accordance with the present invention.

FIG. 3 is a block diagram illustrating a bit synchronization apparatus 200 of the present invention. FIG. 4 is a tabular diagram illustrating exemplary states of the bit synchronizer 200. Referring first to FIG. 3, FIG. 3. illustrates a bit synchronizer 200, having a programmable delay line 250 and a bit tracker 260. The clock is illustrated as an input to the bit synchronizer 200. The output of bit synchronizer 200, with input data 220, is input into an optical gate 280. The output of the optical gate 280 is output data, which is also utilized in a feedback loop 270 to the bit tracker 260. As illustrated in FIG. 3, the optical gate 280 performs a demultiplexing operation, but may perform any other function or operation, such as a logical AND, OR, XOR, etc., that may also require time synchrony between input data and a clock pulse.

Referring to FIG. 3 in conjunction with the state table illustrated in FIG. 4, at the beginning of a communication or networking session, the bit synchronizer is in an initial state based upon the desired channel to be selected. As illustrated in FIG. 4, channel 42 has been selected utilizing the programmable optical delay line 250 set at a timing delay of 42 bit periods, with a zero offset of the bit tracker, illustrated as a bit tracker drift adjustment zero, for a total timing delay of 42 in the initial state. Subsequently, as the communication session has proceeded, there has been an accumulated relative time difference of ¼ of a bit period between the clock and the selected data channel, illustrated as subsequent state A. In the preferred embodiment, the bit tracker has maintained synchrony between the clock and the data by incrementally adjusting the timing of the clock pulse, preferably in increments considerably smaller than the ¼ bit period total time difference which has accumulated since the initial state. Maintaining such synchrony, the programmable delay line continues to have a delay of 42 bit periods, with the bit tracker drift adjustment increasing or incrementing to have an additional delay of one quarter bit period, for a total delay of 42 and ¼ bit periods.

Continuing to refer to FIG. 4, as the communication session continues, subsequent state B, channel 42 is still tracked, but the clock has had an accumulated relative drift compared to the data channel, in this instance an accumulated delay of 2 bit periods. In accordance with the present invention, rather than interrupting the communication session, the data channel continues to be tracked despite this rather significant time difference. As a consequence, in order to continue to track channel 42, a total delay of 44 bit periods is utilized, with the programmable delay maintained at 42 bit periods delay, and the bit tracker drift adjustment having an accumulated delay of two bit periods. As the communication session continues to proceed, illustrated as subsequent state C in FIG. 4, in order to continue to track the selected data channel 42, with continued relative drift of the clock compared to the data channel, a total drift adjustment of 6 bit periods is now employed, for a total delay of 48 bit times. Again, synchrony is maintained in accordance with the present invention despite a significant accumulated time difference, without interruption of the communication session, leading to increased data transmission rates and overall increased transmission efficiency.

In this instance, the bit tracking drift adjustment of 6 bit periods may begin to approach or exceed a limit of maximum physical range of the bit tracker. In such a circumstance, illustrated as subsequent state D, the communication session is interrupted, the bit tracking drift adjustment returning to its physical center, i.e., incrementing or decrementing its timing adjustment from its current position to a zero offset (having zero bit periods of timing acceleration or delay). In addition, to continue to track the selected data channel 42, the programmable delay line is correspondingly adjusted (decremented or incremented) to track at the current total accumulated delay of 48 bit periods, again resulting in a total delay of 48 bit periods, and a resumption of the communication session.

Again, as the communication session proceeds, due to environmental factors, the relative drift of the clock and the data may now be in the opposite direction, illustrated as subsequent state E in FIG. 4. To maintain bit synchrony without interruption, the programmable delay line is maintained at a delay of 48 bit periods, with the accumulated bit tracking drift adjustment of minus 1 (accelerating the timing of the clock by one bit period), resulting in a total relative delay of 47 bit periods. Again, as mentioned above, the selected data channel has continued to be tracked, with no or minimal interruption, despite potentially significant relative timing drift of the clock compared to the data, resulting in higher data rates and increased transmission efficiency.

Figure 5:
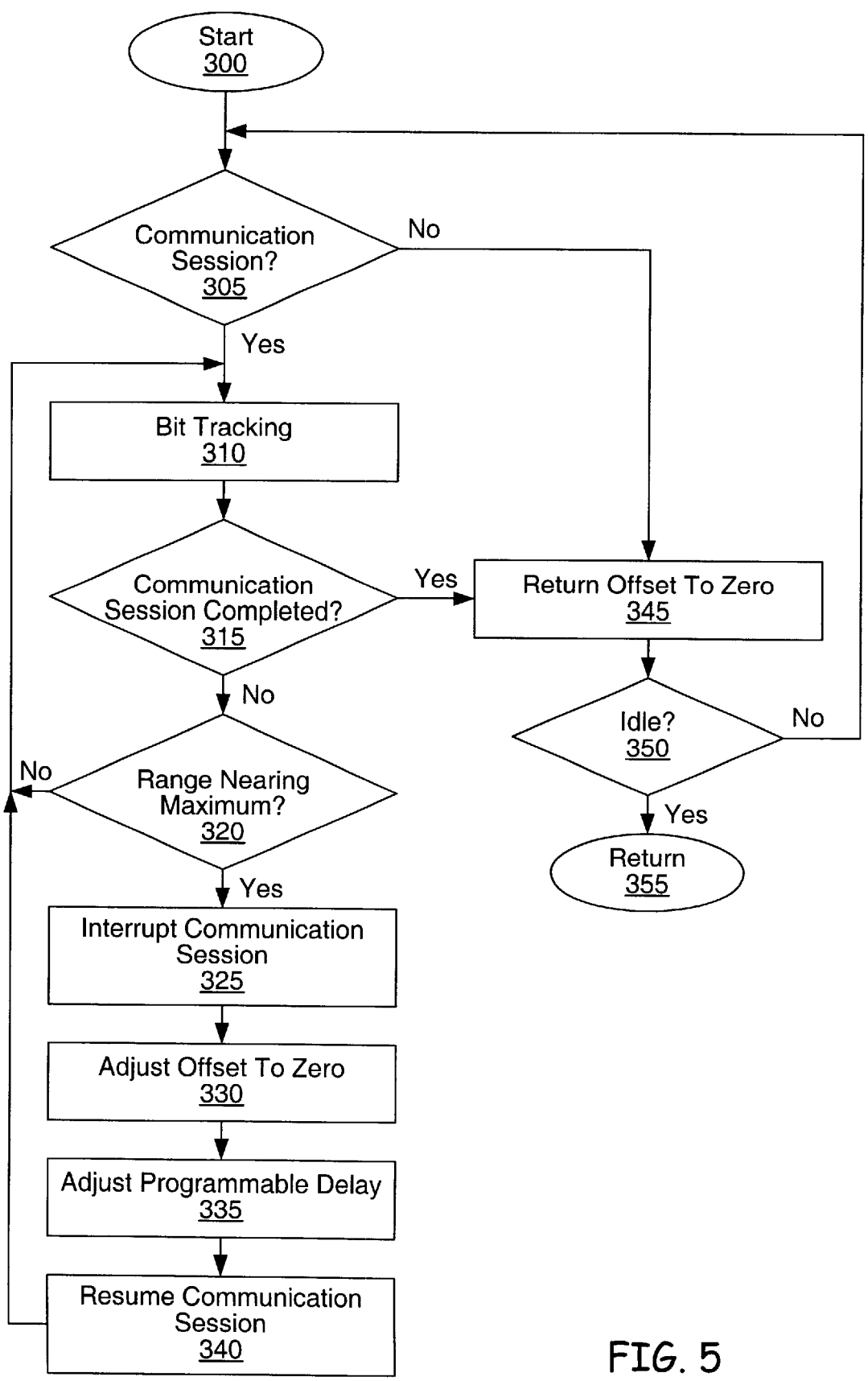
FIG. 5 is a high level flow diagram illustrating the bit synchronization method in accordance with the present invention.

FIG. 5 is a flow diagram illustrating the general or high level bit synchronization method of the present invention. As discussed in greater detail below, the method of the present invention may be programmed and stored, as a set of program instructions for subsequent execution, in a processor, associated memory and equivalent components, such as those discussed below with reference to FIG. 8. Referring to FIG. 5, beginning with start step 300, the method determines whether there is a communication or networking session, step 305. When there is a communication or networking session, step 305, bit. tracking begins, step 310. Next, in step 315, the method determines whether the communication session has been completed. When the communication session has not been completed but is still in progress in step 315, the method determines whether the range of the bit tracking mechanism is approaching its limiting or maximum offset, step 320. If the current range of the bit tracking mechanism is not approaching its limit or maximum in step 320, the method continues to bit track, returning to step 310.

If the range of the bit tracker is nearing its limit or maximum in step 320, such as the 6 bit period maximum range illustrated in FIG. 4, then the communication or networking session is interrupted, step 325. Next, in step 330, the bit tracking offset is adjusted (incremented or decremented) to zero to return the bit tracker to its physical center position, and the programmable optical delay is adjusted correspondingly (decremented or incremented), step 335. For example, as previously illustrated with regard to subsequent states C and D of FIG. 4, in returning (or decrementing) the bit tracker to a zero offset from a relative timing delay drift of 6, the programmable delay line was correspondingly adjusted by increasing (or incrementing) its timing delay by 6 bit periods, with the total delay (or acceleration) maintained at a constant value before and after the adjustment.

Following the return of the bit tracker to a zero offset in step 330 and corresponding adjustment of the programmable delay in step 335, the communication or networking session is resumed, step 340, and the method returns to step 310 to continue bit tracking. If there is no communication session in progress in step 305, or if the communication sessions has been completed in step 315, then the method proceeds to step 345, to return the offset of the bit tracker to zero, physically recentering the bit tracker in anticipation of the next communication session. Following step 345, the method may have an idle state, step 350, followed by the method ending, return step 355. Conversely, the method may not be idle in step 350, and may directly proceed to bit track during another communication session, returning to step 305.

Figure 6:
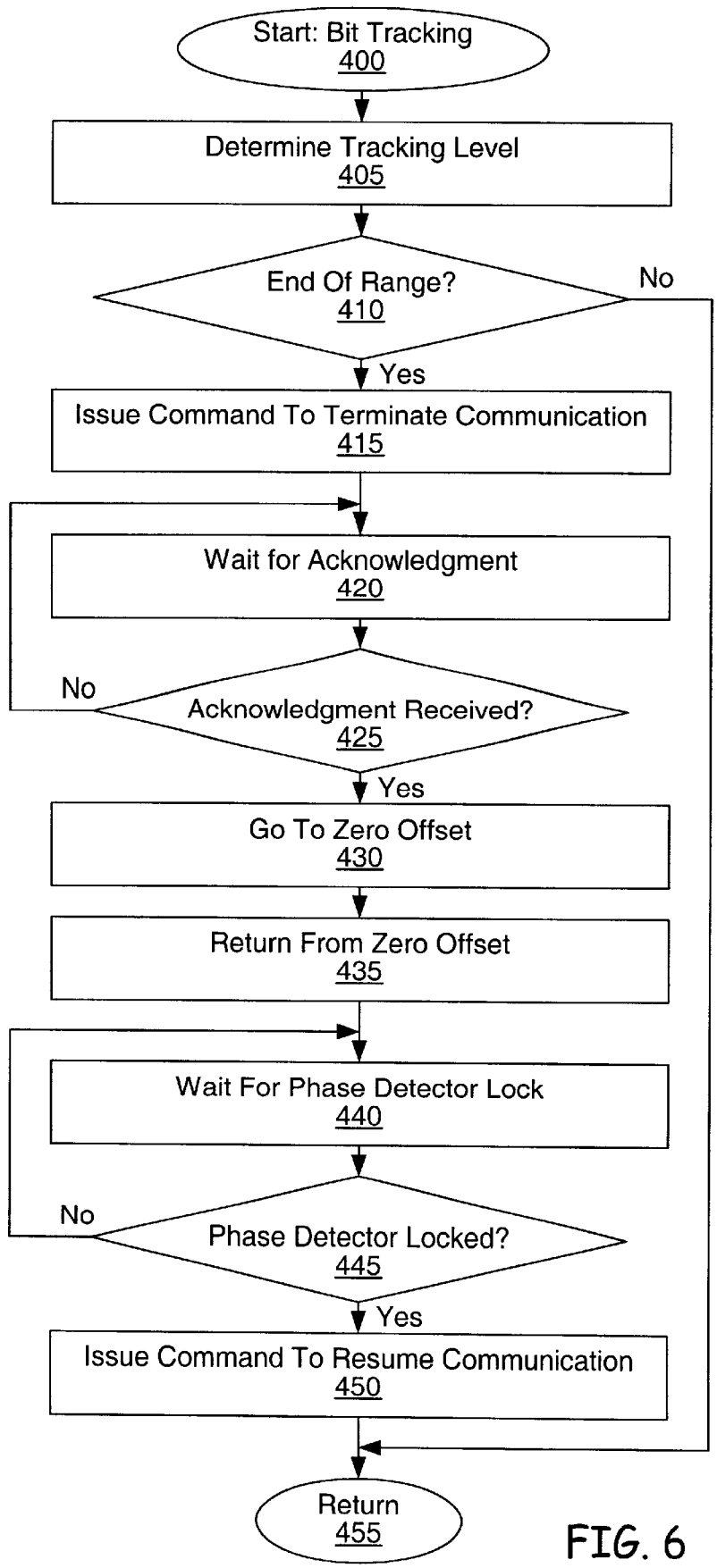
FIG. 6 is a detailed flow diagram illustrating a bit tracking subroutine of the bit synchronization method in accordance with the present invention.

FIG. 6 is a detailed flow diagram illustrating in greater detail the bit tracking of the bit synchronization method of the present invention, and should be interpreted in conjunction and dovetailing with FIG. 5. Beginning with start step 400, the method first determines the current bit tracking level, step 405. Such a tracking level may be determined, for example, as a bit period increment or, as discussed with regard to various apparatus embodiments, as a voltage or current level of the optical bit tracking mechanism. Next, the method determines whether the current tracking level is approaching a physical limit or is at the end of its physical range, step 410. When the current tracking level is still within a dynamic range of the bit tracking mechanism, step 410, the bit tracking loop may continue, proceeding to return step 455. Optical bit tracking then continues as an ongoing process, as illustrated in steps 310 and 315 of FIG. 5.

Continuing to refer to FIG. 6, when the current tracking level is at or near the limit or maximum of the dynamic range of the optical bit tracking mechanism, step 410, the method then generates or issues a command to temporarily interrupt or terminate the communication session, step 415. The method then waits to receive an acknowledgment, step 420, and when an acknowledgment is received, step 425, the method proceeds to the zero offset subroutine, step 430. As mentioned above, the zero offset subroutine will return the bit tracker to its physical center of operation, and correspondingly adjust the programmable delay line, to continue to track the same, selected data channel. Returning from the zero offset loop, step 435, the method waits for a phase detector lock, step 440, such as allowing transients to settle. When the phase detector is locked, step 445, the method issues or generates a command to resume communication, step 450. The bit tracking sub-routine may then end, return step 455, again with bit tracking being continuous in steps 310 and 315 illustrated in FIG. 5.

Figure 7:
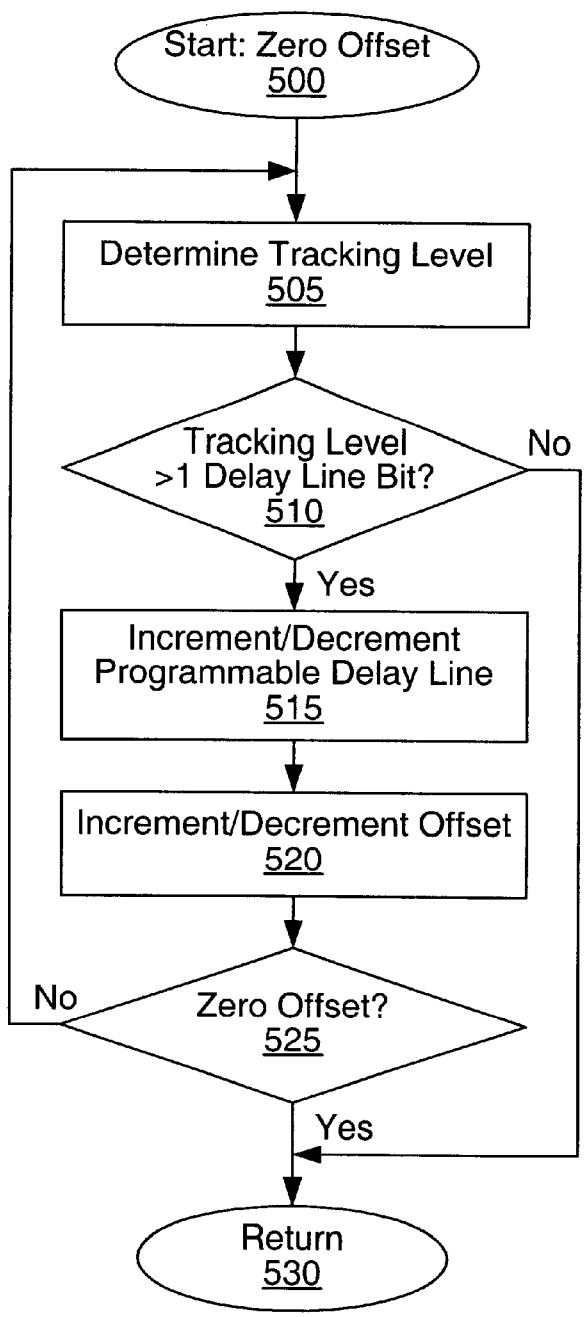
FIG. 7 is a detailed flow diagram illustrating a zero offset subroutine of the bit synchronization method in accordance with the present invention.

FIG. 7 is a detailed flow diagram illustrating the zero offset portion of the bit synchronization method of the present invention. As indicated above, the zero offset methodology is initiated if and when the optical bit tracking mechanisms is at or approaching its physical limits, such as a limit of travel lengths. Beginning with start step 500, the method determines the current bit tracking level, step 505, similar to step 405 illustrated in FIG. 6. For example, the tracking level may be determined by bit periods, or may be determined by voltage or current levels of the tracking mechanism. Next, in step 510, when the current bit tracking level is greater than 1 bit period of clock timing delay or acceleration, or its equivalent, the method proceeds to step 515 to correspondingly increment or decrement the programmable delay line. Following step 515, the method correspondingly decrements or increments the offset of the bit tracker. The method repeats, returning to step 505 until a zero offset is reached, step 525. When a zero offset has been reached, step 525, the zero offset subroutine may end, return step 530. As indicated above, the zero offset subroutine is initiated either between communication sessions (steps 305 and 315 of FIG. 5), to physically return the bit tracker to its central position in anticipation of the next communication or networking session, or when the bit tracker is at or approaching the limit of its dynamic range, when ongoing data transmission would be inaccurate without the continued tracking enabled only by returning the bit tracker to its central position.

Figure 8:
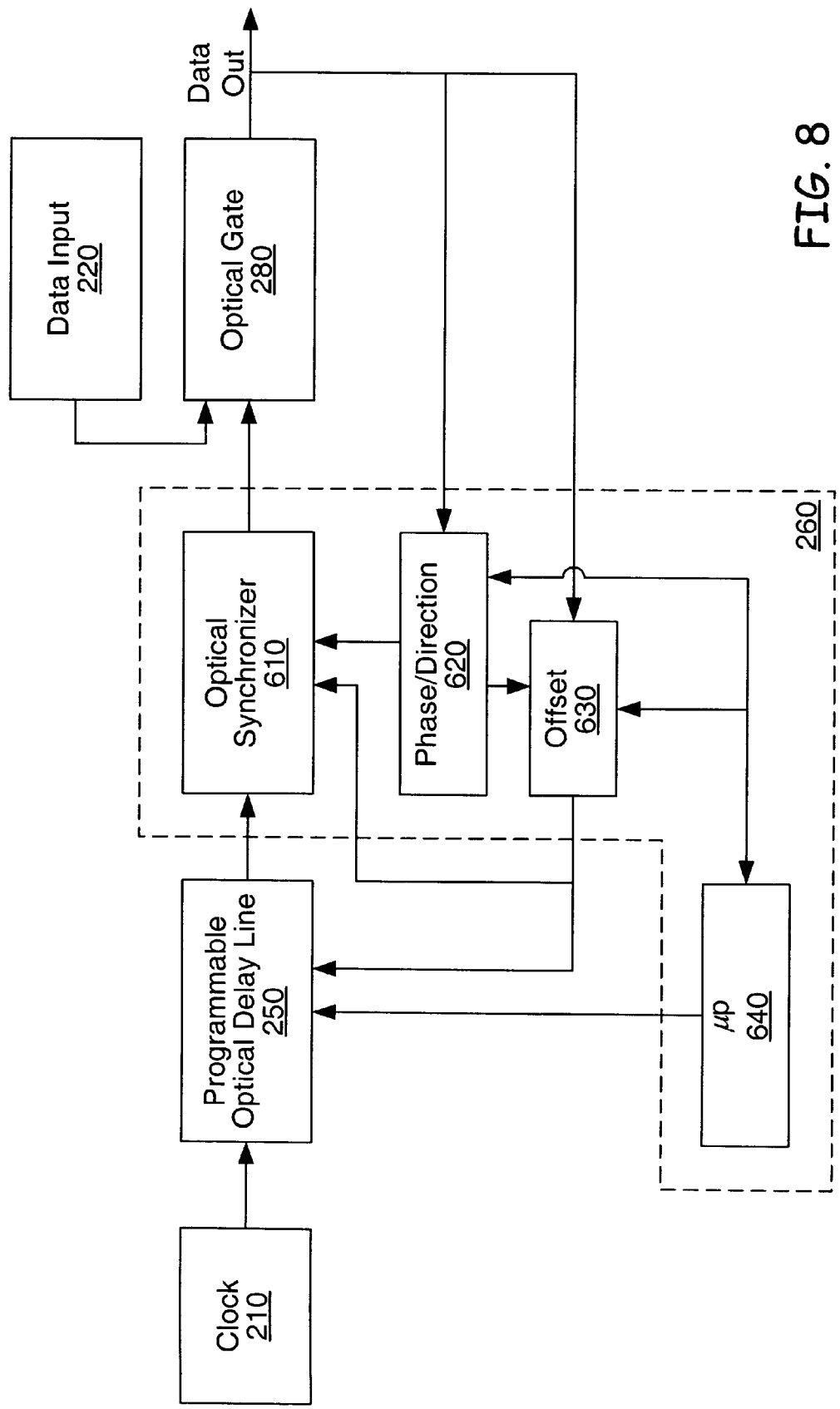
FIG. 8 is a block diagram illustrating a first preferred embodiment of a bit synchronization apparatus in accordance with the present invention.

FIG. 8 is a block diagram illustrating a first preferred embodiment of a bit synchronization apparatus in accordance with the present invention. Referring to FIG. 8, the clock 210 is input into the programmable optical delay line 250, while the data (such as multiplexed data channels) is input into the optical gate 280. As mentioned above, because the concern is the relative time difference between the clock and the selected data, with the timing of one being delayed or accelerated relative to the other, the input positions of the clock 210 and the data 220 are interchangeable. Continuing to refer to FIG. 8, the output of the programmable optical delay line 250 is input into the optical synchronizer 610. The output of the optical synchronizer, along with data 220, is input into the optical gate 280. The output data from the optical gate 280 is fed back to phase difference and direction detector 620, which provides a corresponding interpolation signal input into the optical synchronizer 610. The output data is also analyzed to determine whether a return to zero offset is needed, in block 630, with a corresponding offset signal provided as input to both the optical synchronizer 610 and to the programmable optical delay line 250. The optical synchronizer 610, the phase difference and direction detector 620, and the offset detector 630, comprise the bit tracker 260.

Also illustrated in FIG. 8, the bit tracking of the present invention may also be under the direction and control of a processor 640. The processor 640 may include a single integrated circuit ("IC"), or may include a plurality of integrated circuits or other components connected, arranged or grouped together, such as microprocessors, digital signal processors, ASICs, associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed above, with associated memory, such as microprocessor memory or additional RAM, ROM, EPROM or E$^2$PROM. In addition, as mentioned above, the methodology of the present invention may be programmed and stored, as a set of program instructions for subsequent execution, in the processor 640 with its associated memory and equivalent components. In that event, the phase difference and direction detector 620 and the offset detector 630 may be incorporated and subsumed within processor 640, with the processor 640 performing all related functionality.

Figure 9A:
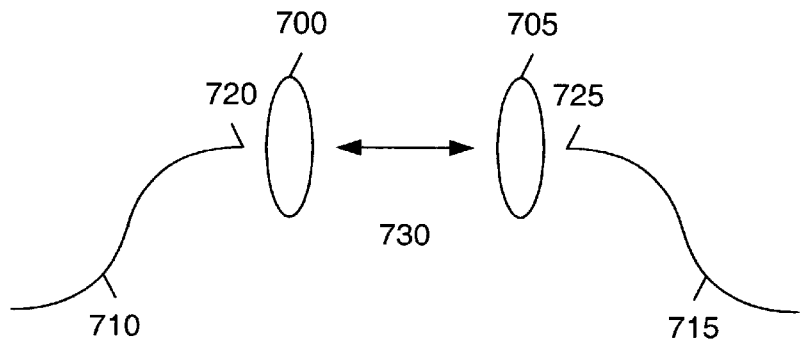
FIG. 9A is a general block diagram illustrating an optical synchronizer mechanism that may be utilized in an apparatus embodiment in accordance with the present invention.
Figure 9B:
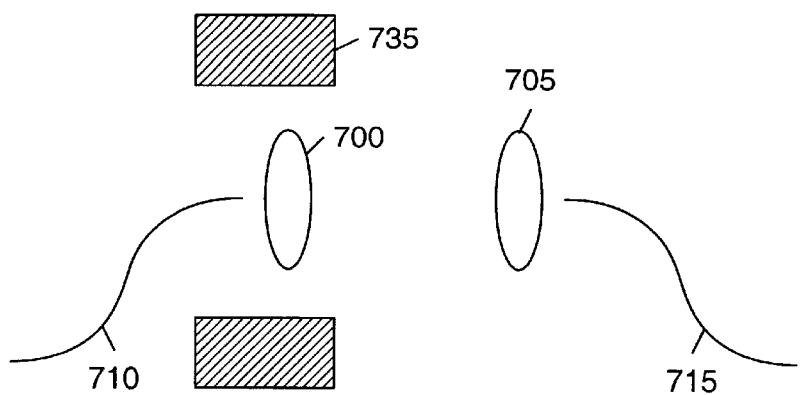
FIG. 9B is a block diagram illustrating a voice coil or piezo-ceramic actuator optical synchronizer mechanism that may be utilized in an apparatus embodiment in accordance with the present invention.
Figure 9C:
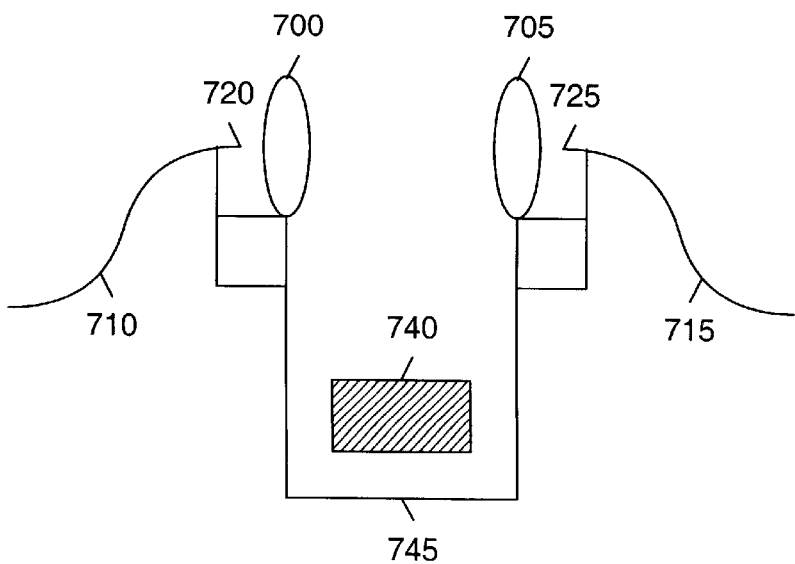
FIG. 9C is a block diagram illustrating a tuning fork optical synchronizer mechanism that may be utilized in an apparatus embodiment in accordance with the present invention.

FIGS. 9A, 9B and 9C are block diagrams illustrating various optical synchronizer 610 apparatuses that may be utilized in the preferred embodiments of the present invention. FIG. 9A is a general block diagram illustrating an optical synchronizer mechanism; FIG. 9B is a block diagram illustrating a voice coil or piezo-ceramic actuator optical synchronizer mechanism; and FIG. 9C is a block diagram illustrating a tuning fork optical synchronizer mechanism.

FIG. 9A is illustrates the use of two collimating lenses 700 and 705 which are respectively, coupled to fiber optic lines 710 and 715. As illustrated in FIG. 9A, the relative delay between the clock pulse and the selected data pulse is adjusted through the relative motion 730 between the two cut ends 720 and 725 of, respectively, the fiber optic lines 710 and 715 (including corresponding motion of the lenses 700 and 705). For such relative motion, the collimating lenses 700 and 705 are utilized to provide focus and to reduce the required accuracy or precision of axial alignment between the two cut ends 720 and 725 of the respective fiber optic lines 710 and 715. The relative motion between the cut end 720 (with collimating lens 700), on the one hand, and the cut end 725 (with collimating lens 705), on the other hand, changes a gap between the two ends 720 and 725 of, respectively the two optical fibers 710 and 715. Changing the gap provides a variable time delay in the optical transmission between the two fibers 710 and 715. In the preferred embodiment providing an interpolation signal for control within 0.5 picoseconds, a typical range of relative motion (in one direction) may be approximately 0.036 inches. Also in the preferred embodiments, the limits or maximum range of motion of the optical synchronizing mechanism (within synchronizer 610) are preferably designed to be greater than this typical range, to avoid reprogramming the programmable delay line 250 during a single communication session.

Convenient mechanisms for providing the relative physical motion 720 include voice coil motors (or other servo mechanisms), such as those used in the focus mechanism (servo) of CD drives, illustrated as voice coil motor 730 in FIG. 9B. Also in FIG. 9B, in lieu of a voice coil motor 730, a piezo-ceramic actuator may also be utilized. A third mechanism, illustrated in FIG. 9C, is a tuning fork 735 with a drive coil 740, typically used for optical light choppers. In the tuning fork 735 embodiment, the interpolation signal should be provided at the resonant frequency of the tuning fork 735. For both devices illustrated in FIGS. 9B and 9C, the relative position of the ends 720 and 725 of the fibers 710 and 715 may be programmed by the drive current through the device, typically determined by the voltage level generated by the phase and direction detector 620 or equivalent optical synchronizer 610 drive components. Other mechanisms, not separately illustrated, may also include general servo mechanisms and other piezoelectric devices.

Figure 10:
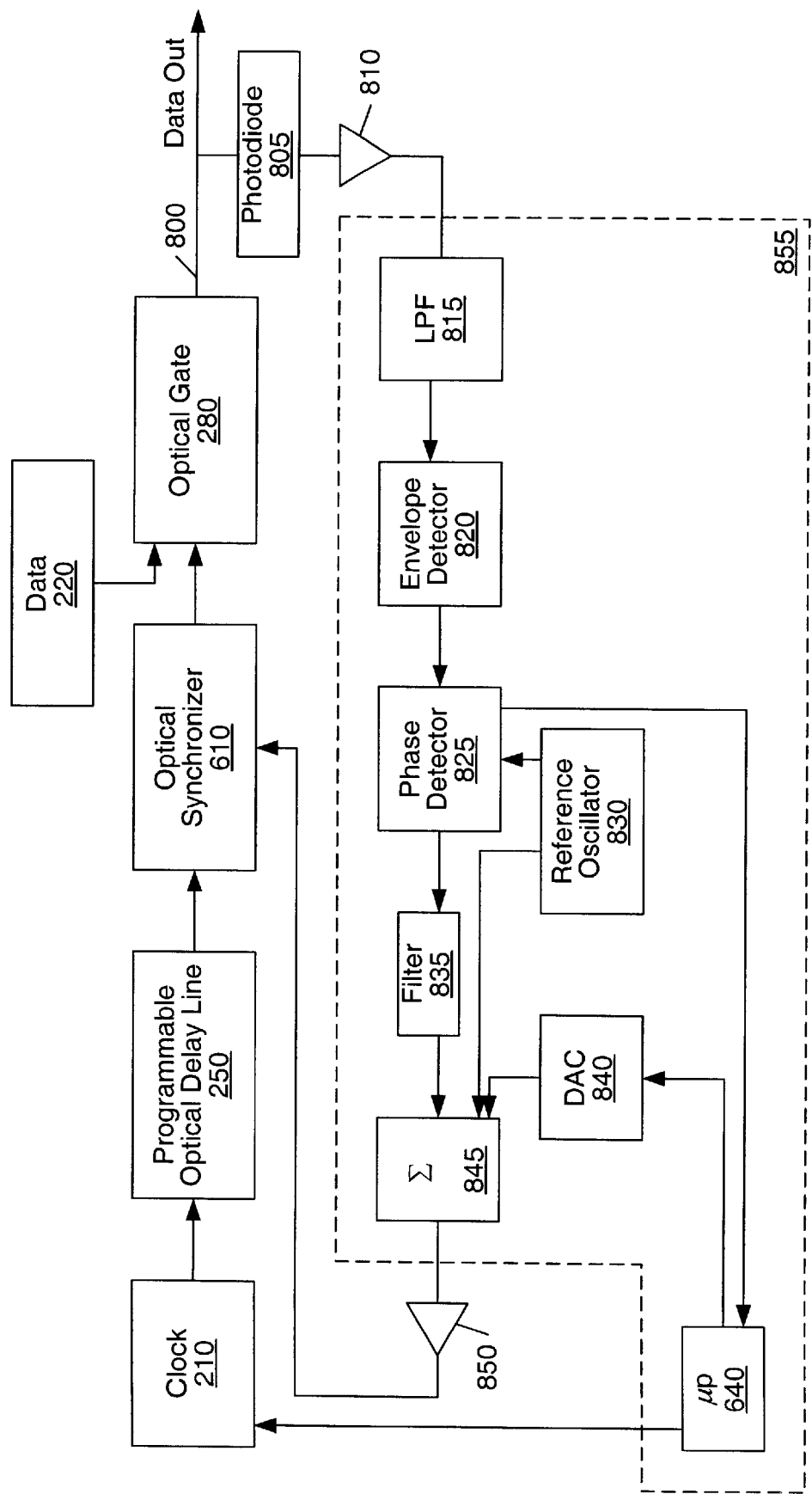
FIG. 10 is a block diagram illustrating a second preferred embodiment of a bit synchronization apparatus in accordance with the present invention.

FIG. 10 is a block diagram illustrating a second preferred embodiment of a bit synchronization apparatus in accordance with the present invention. As previously illustrated, the clock signal from clock 210 is synchronized with the data 220 via programmable optical delay line 250 and optical synchronizer 610. Also input into the optical synchronizer 610, via amplifier 850 and summer 845, is a "dither" signal from reference oscillator 830. The dither signal is a small amplitude, low frequency signal, introduced as a known carrier signal for bit tracking purposes. This dither signal introduces a very small timing difference with a known phase, and will cause the clock signal to have a relative "sweep" back and forth across the data signal, providing information concerning any time difference or timing error between the clock signal and the input data.

Continuing to refer to FIG. 10, the synchronized clock signal and the input data 220 are input into optical gate 280, which then provides output data A photodiode 805 may be coupled to the data output line 800 to convert light pulses into an electronic form, which is then amplified in amplifier 810. The output of amplifier 810 is then low pass filtered in low pass filter 815 and envelope detected in envelope detector 820. The low pass filter 815 and envelope detector 820 select or filter out the low frequency signal previously introduced, such as 100 Hz sine wave signal. Any timing difference (or timing error between the clock and data is converted to an amplitude error appearing in the low frequency signal (which has been envelope detected). When phase detected in phase detector 825, information is provided concerning whether the clock, on average, is leading or lagging relative to the data, and as a consequence, what direction the synchronizer 610 should move to maintain timing synchrony. The signal from the phase detector 825 is then filtered in filter 835, to avoid potential oscillations, for example, in the optical synchronizer 610. More particularly, filter 835 performs a proportional integral derivative, providing a gain to scale, integrating long term error to zero, with lead bits for damping (preventing oscillations or overshooting). The output of the phase detector 825, namely the timing difference and direction, as an error signal, is also input into the processor 640, which may then make a determination to provide digital control offsets, generate an offset signal, or provide an interpolation signal. For example, the processor 640 may remove system errors, and may allow the optical synchronizer 610 to move a significant distance without loss of data bits. In providing an offset signal, a digital signal output from the microprocessor is provided to a digital to analog converter (DAC) 840, which then generates an analog signal indicative of the desired offset, if any. The offset signal and the filtered error signal, along with the dither signal from the reference oscillator, is then combined in summer 845, which is then converted to the correct voltage and current required by the optical synchronizer 610 in amplifier 850. Continuing to refer to FIG. 10, the various components enclosed within block 855, namely low pass filter 815, envelope detector 820, phase detector 825, reference oscillator 830, filter 835, DAC 840 and summer 845, may be implemented within processor 640, such as a microprocessor or digital signal processor, with corresponding program instructions.

The advantages of the present invention are significant and should not be underestimated. First, the present invention provides continuous bit tracking over a multiple bit periods without resetting or reprogramming the programmable optical delay line. Avoiding such resetting or reprogramming increases data transmission efficiency, prevents interruptions in transmission, and prevents a loss of data bits (requiring retransmission).

Second, the present invention overcomes a significant current obstacle in optical transmission, namely, the lack of available optical memory devices which are capable of operating at such high, terabit data rates. Use of the present invention avoids reprogramming to maintain synchronization and concomitant data losses, which in prior art electronic transmission systems is overcome by buffering and storing the data bits during such reprogramming periods. Optical communication systems, however, currently do not have such a buffering and storage option.

Also as readily apparent from the detailed description above, the apparatus and method embodiments of the present invention provide optical bit synchronization, providing capability to track relative bit drifting or skewing between clock pulses and selected data channels, and capability to maintain such bit synchronization spanning several bit periods during a single transmission and without interruption of the transmission. In addition, the apparatus and method embodiments may be implemented cost-effectively, without requiring significant revision of currently existing optical data transmission hardware.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. An apparatus for bit synchronization in an optical time division multiplexed communication system, the apparatus comprising:
   means for tracking bit synchronization between a clock pulse and a selected data bit during a communication session; and
   means for interrupting the communication session when a bit tracking range is approaching a predetermined limit, means for returning the bit tracking range to a zero offset responsive to the bit tracking range approaching the predetermined limit and for correspondingly adjusting timing of a programmable optical delay, and means for resuming the communication session upon completion of said adjusting.

2. The apparatus of claim 1, further comprising:
   means for returning the bit tracking range to a zero offset when the communication session has been completed.

3. The apparatus of claim 1 wherein the bit tracking range spans a plurality of bit periods.

4. The apparatus of claim 1 further comprising:
   means for determining a timing difference between the clock pulse and the selected data bit;
   means for generating an error signal proportional to the timing difference; and
   means for adjusting a timing of the clock pulse until the error signal approaches zero.

5. The apparatus of claim 1 further comprising means for adjusting a relative spacing between a first collimating lens and a second collimating lens, the first collimating lens coupled to a first optical line and the second collimating lens coupled to a second optical line.

6. The apparatus of claim 1 further comprising means for incrementally accelerating clock pulse timing.

7. The apparatus of claim 1 further comprising means for incrementally delaying clock pulse timing.

8. A method for bit synchronization in an optical communication system, the method comprising:
   monitoring a phase difference between a clock pulse and a transmitted data bit during a communication session;
   interrupting the communication session when the phase difference approaches a predetermined limit;
   adjusting the phase difference between the clock pulse and a next data bit to be transmitted; and
   resuming the communication session; wherein said resuming comprises transmitting the next data bit.

9. The method as recited in claim 8, wherein the predetermined limit defines a first limit of a bit tracking range, the bit tracking range having the first limit and a second limit, and wherein the bit tracking range comprises a range of phase difference values between the clock pulse and the transmitted data bit.

10. The method as recited in claim 9, wherein the bit tracking range spans a plurality of bit-periods.

11. The method as recited in claim 9 further comprising generating an interpolation signal, the interpolation signal being indicative of the phase difference between the clock pulse and the transmitted data bit.

12. The method as recited in claim 11 further comprising delaying or accelerating the clock pulse responsive to the interpolation signal.

13. The method as recited in claim 9 further comprising detecting whether the phase difference is positive or negative.

14. The method as recited in claim 8, wherein said adjusting comprises adjusting the timing of a programmable optical delay.

15. The method as recited in claim 14, wherein said adjusting the timing of the programmable optical delay comprises incrementing the timing of the programmable optical delay.

16. The method as recited in claim 14, wherein said adjusting the timing of the programmable optical delay comprises decrementing the timing of the programmable optical delay.

17. The method as recited in claim 8 further comprising performing said monitoring, said interrupting, said adjusting, and said resuming for a plurality of data channels.

18. The method as recited in claim 8 further comprising generating an offset signal, wherein the offset signal is indicative of a timing difference between the clock pulse and the next data bit to be transmitted.

19. The method as recited in claim 18, wherein said adjusting the phase difference between the clock pulse and the next data bit to be transmitted comprises adjusting the timing difference between the clock pulse and the next data bit to be transmitted responsive to the offset signal.

20. An apparatus for bit synchronization in an optical communication system, the apparatus configured to receive an input clock signal and a data clock signal, the apparatus comprising:
   a optical delay line;
   an optical synchronizer coupled to the optical delay line;
   an optical gate coupled to the optical synchronizer, wherein the optical synchronizer is configured to drive an output data signal;
   a processor coupled to the optical delay line and the optical synchronizer, wherein the processor is configured to execute instructions which cause the apparatus to:
      monitor the phase difference between the input clock signal and the output data signal during a communication session;
      interrupt the communication session if the phase difference between the input clock signal and the output data signal approaches a predetermined limit;
      adjust the phase difference between the output data signal and the input clock signal; and
      resume the communication session.

21. The apparatus as recited in claim 20, wherein adjusting the phase difference between the output data signal and the clock signal comprises adjusting the timing difference between the input clock signal and the input data signal.

22. The apparatus as recited in claim 21, wherein the processor is configured to adjust the timing difference by incrementally accelerating clock pulse timing.

23. The apparatus as recited in claim 21, wherein the processor is configured to adjust the timing difference by incrementally delaying clock pulse timing.

24. The apparatus as recited in claim 21, wherein the optical delay line is a programmable optical delay line, and wherein the processor is configured to adjust the timing by executing instructions that cause a timing delay to be adjusted in the programmable optical delay line.

25. The apparatus as recited in claim 20, wherein the predetermined limit defines a first limit of a bit tracking range, the bit tracking range having a first limit and a second limit, and wherein the bit tracking range comprises a range of phase difference values between the input clock signal and the output data signal.

26. The apparatus as recited in claim 25, wherein the bit tracking range spans a plurality of bit-periods.

27. The apparatus as recited in claim 20 further comprising a phase and direction detector coupled to the processor, the optical gate, and the optical synchronizer, wherein the phase and direction detector is configured for determining the magnitude and the direction of the phase difference between the input clock signal and the output data signal.

28. The apparatus as recited in claim 27, wherein the optical synchronizer is configured to receive an interpolation signal from the phase and direction detector, the interpolation signal generated by the phase and direction detector responsive to the phase difference.

* * * * *